(12) United States Patent
Yamaguchi et al.

(10) Patent No.: US 11,773,564 B2
(45) Date of Patent: Oct. 3, 2023

(54) WORK EQUIPMENT FOR MOTOR GRADER

(71) Applicant: Komatsu Ltd., Tokyo (JP)

(72) Inventors: Kota Yamaguchi, Tokyo (JP); Yuji Asai, Tokyo (JP); Toshihiro Yone, Tokyo (JP)

(73) Assignee: Komatsu Ltd., Tokyo (JP)

( * ) Notice: Subject to any disclaimer, the term of this patent is extended or adjusted under 35 U.S.C. 154(b) by 1106 days.

(21) Appl. No.: 16/480,121

(22) PCT Filed: Apr. 25, 2018

(86) PCT No.: PCT/JP2018/016816
§ 371 (c)(1),
(2) Date: Jul. 23, 2019

(87) PCT Pub. No.: WO2019/207688
PCT Pub. Date: Oct. 31, 2019

(65) Prior Publication Data
US 2021/0332551 A1    Oct. 28, 2021

(51) Int. Cl.
*E02F 3/76*   (2006.01)
*E02F 3/80*   (2006.01)
*F16C 19/16*  (2006.01)
*F16N 1/00*   (2006.01)

(52) U.S. Cl.
CPC .......... *E02F 3/764* (2013.01); *E02F 3/80* (2013.01); *F16C 19/16* (2013.01); *F16N 1/00* (2013.01); *F16N 2210/04* (2013.01)

(58) Field of Classification Search
CPC .... E02F 3/764; E02F 3/80; F16N 1/00; F16N 7/22; F16N 21/00; F16N 21/06
See application file for complete search history.

(56) References Cited

U.S. PATENT DOCUMENTS

| | | | | |
|---|---|---|---|---|
| 3,470,967 A | * | 10/1969 | Easterling | E02F 3/764 172/793 |
| 3,923,125 A | * | 12/1975 | Rosenthal | F16L 27/087 277/351 |
| 4,015,669 A | * | 4/1977 | Cole | E02F 3/80 74/606 R |

(Continued)

FOREIGN PATENT DOCUMENTS

CN    204823952 U    12/2015
CN    107842703 A     3/2018

(Continued)

*Primary Examiner* — Thomas B Will
*Assistant Examiner* — Blake E Scoville
(74) *Attorney, Agent, or Firm* — Locke Lord LLP

(57) ABSTRACT

The work equipment for the motor grader includes: a drawbar having a drawbar plate; a bearing having an outer ring and inner ring, the outer ring being fixed to a lower surface of the drawbar plate and the inner ring, disposed inside the outer ring ring; a circle having a circle plate that is fixed to a lower end of the inner ring over the peripheral direction; a blade supported by the circle; a peripheral-direction pipe extending in the peripheral direction of the outer ring along a peripheral surface of the outer ring and connected to an end portion of an outer peripheral side of the plurality of lubricant supply holes; and the lubricant inlet port connected to the peripheral-direction pipe and capable of introducing a lubricant oil from an outside.

3 Claims, 5 Drawing Sheets

(56) References Cited

U.S. PATENT DOCUMENTS

| | | | |
|---|---|---|---|
| 4,961,667 A | 10/1990 | Reinsma et al. | |
| 5,435,454 A * | 7/1995 | Ishii | B65D 51/16 220/374 |
| 5,667,020 A * | 9/1997 | Palmer | E02F 3/765 74/448 |
| 6,874,599 B1 * | 4/2005 | Riskedal | B62D 53/0885 184/105.3 |
| 8,215,455 B1 * | 7/2012 | Hamilton | B62D 53/0885 184/29 |
| 2004/0149463 A1 * | 8/2004 | Maeda | E02F 3/7645 172/297 |
| 2012/0073890 A1 * | 3/2012 | Bindl | E02F 3/764 180/374 |
| 2014/0294486 A1 * | 10/2014 | Staade | B62D 7/16 403/113 |
| 2015/0135866 A1 * | 5/2015 | Staade | E02F 3/764 74/89.18 |
| 2015/0233091 A1 | 8/2015 | Furusho et al. | |

FOREIGN PATENT DOCUMENTS

| | | |
|---|---|---|
| JP | 2004-092842 A | 3/2004 |
| JP | 2012-202507 A | 10/2012 |

* cited by examiner

WORK EQUIPMENT FOR MOTOR GRADER

TECHNICAL FIELD

The present invention relates to a work equipment for a motor grader.

BACKGROUND TECHNOLOGY

Patent Document 1 discloses a work equipment for a motor grader. The work equipment has a circle that supports a blade. The circle is rotatably supported by a drawbar via a bearing provided in a space between the circle and the drawbar. In a clearance between the drawbar and the circle rotating relative to each other, a seal for preventing from dirt entering into the space is provided.

PRIOR ART DOCUMENT

Patent Document

[Patent Document 1] US Patent Application No. 2015-0135866, specification.

SUMMARY OF THE INVENTION

Problems to be Solved by the Invention

Incidentally, a lubricant such as grease must be supplied to a sliding portion of the bearing. In addition, it is necessary to supply the lubricant not only in part of the bearing in a peripheral direction but also in a wide range. When a worker manually supplies the lubricant directly, it is necessary to apply the lubricant in a wide range in the peripheral direction in a case of a large motor grader, and if the structure of the work equipment does not take into consideration the workability of the worker, the work becomes complicated.

The present invention is taken into consideration in view of the above problem, and the object of the present invention is to provide a work equipment for a motor grader that can easily supply lubricant to the bearings.

Means for Solving the Problem

An aspect of the present invention provides a work equipment for a motor grader including: a drawbar that has a drawbar plate extending along a horizontal surface; a bearing that has an outer ring and an inner ring, the outer ring having an annular shape when seen from a plan view, fixed to a lower surface of the drawbar plate, and having a plurality of lubricant supply holes penetrating in a radial direction and disposed at a distance from each other in a peripheral direction, and an inner ring having an annular shape when seen from a plan view, disposed inside the outer ring, and connected so as to be rotatable in the peripheral direction with respect to the outer ring; a circle that has a circle plate fixed to a lower end of the inner ring over the peripheral direction; a blade that is supported by the circle; a peripheral-direction pipe that extends in the peripheral direction of the outer ring along an outer peripheral surface of the outer ring and is connected to an end portion on an outer peripheral side of the plurality of lubricant supply holes; and a lubricant inlet port that is connected to the peripheral-direction pipe and is capable of introducing a lubricant in the peripheral-direction pipe from an outside.

According to the above aspect, when the lubricant is introduced into the lubricant inlet port, the lubricant is introduced into the plurality of lubricant supply holes of the outer ring through the peripheral-direction pipe connected to the lubricant inlet port. That is, the lubricant can be collectively introduced into the plurality of lubricant supply holes arranged at a distance from each other in the peripheral direction through the peripheral-direction pipe. As a result, the lubricant is introduced between the outer ring and the inner ring from each of the lubricant supply holes, so that the lubricant can be easily supplied to a wide area in the peripheral direction between the outer ring and the inner ring.

Effect of Invention

According to the work equipment for the motor grader of the above aspect, the lubricant can be easily supplied to the bearings.

BRIEF DESCRIPTION OF DRAWINGS

In FIG. 2, a blade is omitted from the drawing.

MODE FOR CARRYING OUT THE INVENTION

An embodiment of the present invention will be described in detail below with reference to FIGS. 1 to 5.

<<Motor Grader>>

Figure 1:
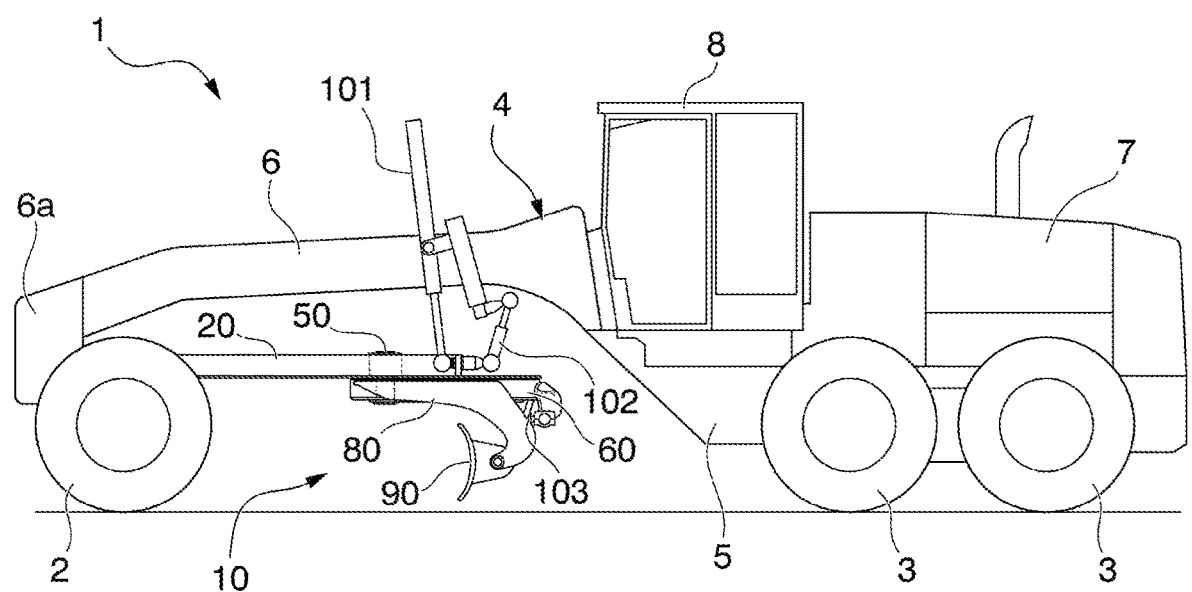
FIG. 1 is a side view of a motor grader according to an embodiment of the present invention.

As shown in FIG. 1, a motor grader 1 of the embodiment is mainly provided with a traveling wheels 2,3, a vehicle body frame 4, a cab 8, and a work equipment 10. The work equipment 10 has a blade 90. The motor grader 1 performs works such as ground leveling work, snow removal work, light cutting work, material mixing work, or the like, by the blade 90.

The motor grader 1 has front wheels 2 and rear wheels 3 as traveling wheels 2, 3. The motor grader 1 of the present embodiment has two front wheels 2, each one of which is provided on both side, and four rear wheels 3, each two of which are provided on both side.

In the following description, forward-rearward directions refers to forward-rearward directions of the motor grader 1. That is, the "forward-rearward directions" means the forward-rearward directions as viewed from the driver seated on the driver's seat of the cab 8. A "vehicle width direction" means a vehicle width direction of the motor grader 1. That is, the vehicle width direction means left and right directions as viewed from the driver seated on the driver's seat of the cab 8.

The vehicle body frame 4 includes a rear frame 5, a front frame 6, and an exterior cover 7. The rear frame 5 supports components (not shown) such as an exterior cover 7 and an engine disposed in an engine chamber. The exterior cover 7 covers the engine chamber at a rear of the cab 8. In the rear frame 5, each of the four rear wheels 3 is attached so as to be capable of being rotationally driven by driving force from the engine. The front frame 6 is attached to a front of the rear frame 5. A counterweight 6a is attached to a front end of the front frame 6. At a lower portion of the front end of the front frame, the two front wheels 2 are rotatably attached.

The cab 8 is placed on a front portion of the rear frame 5. In an inside portion of the cab 8, an operating unit (not shown) such as a steering wheel, a shift lever, an operation lever for the work equipment 10, a brake, an accelerator pedal, an inching reel, and the like, are provided.

<<Work Equipment>>

Figure 2:
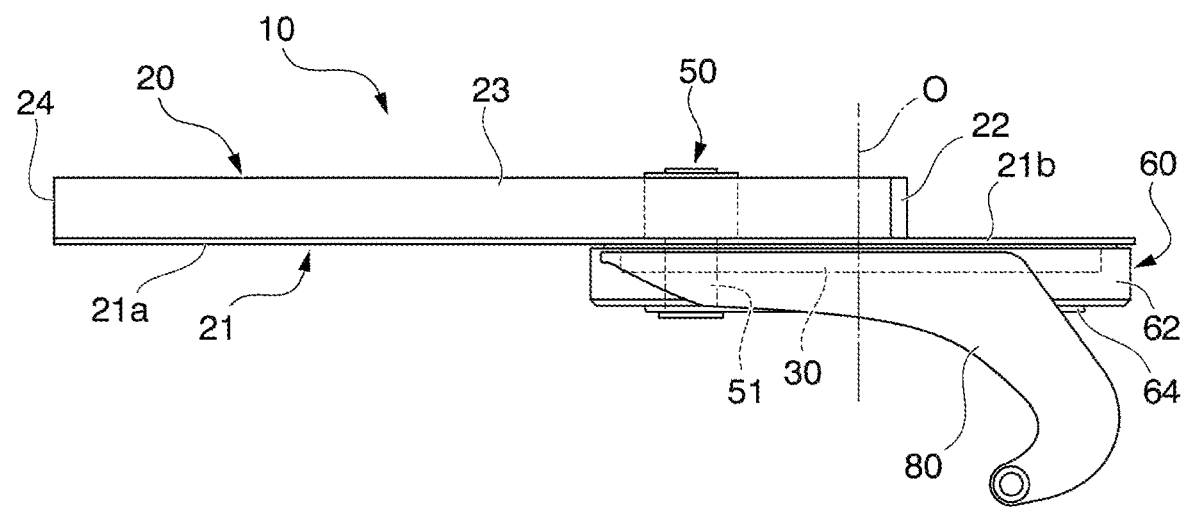
FIG. 2 is a side view of a work equipment for the motor grader according to the embodiment of the present invention.
Figure 3:
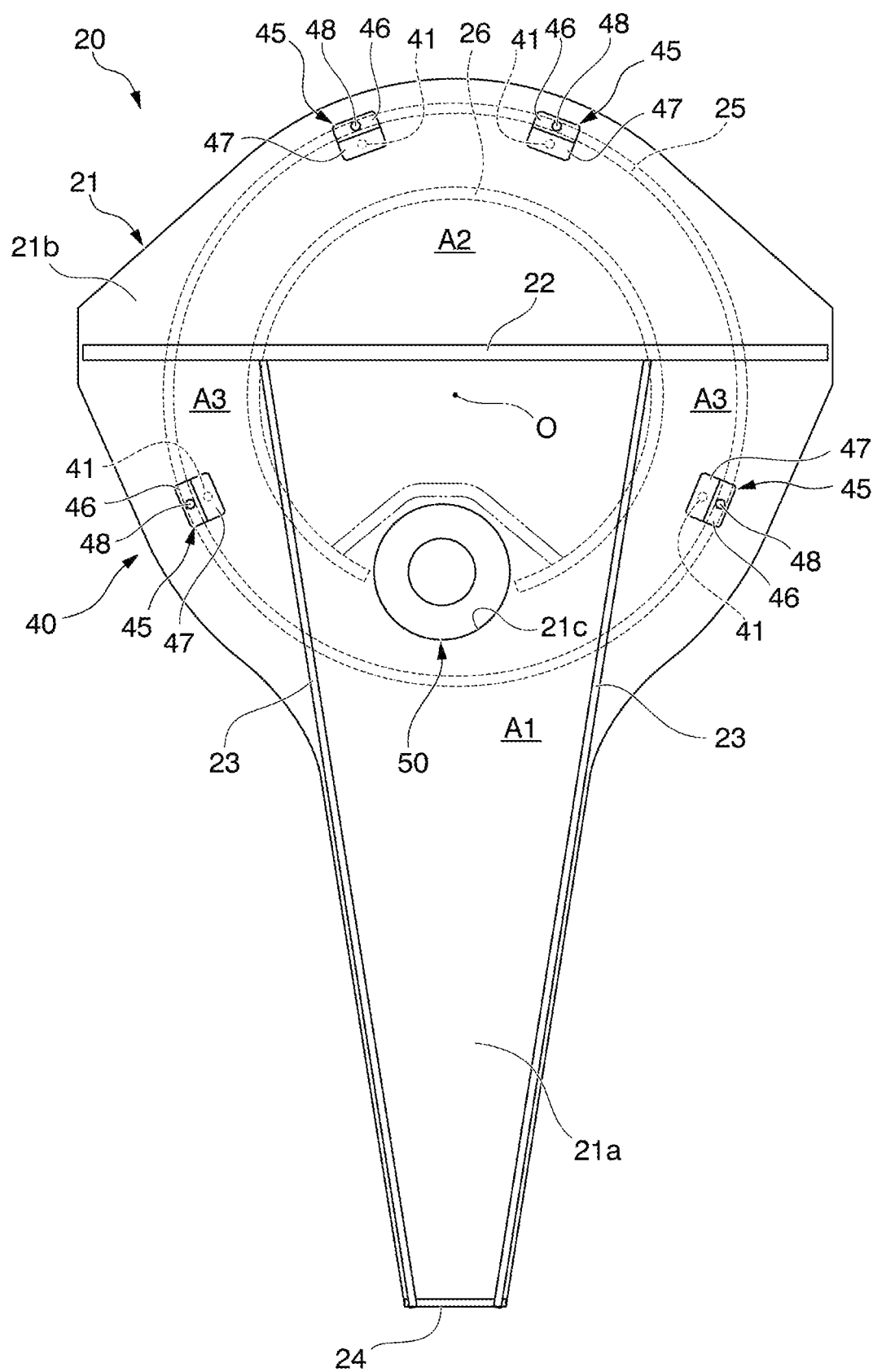
FIG. 3 is a plan view of a drawbar of the work equipment for the motor grader according to the embodiment of the present invention.
Figure 4:
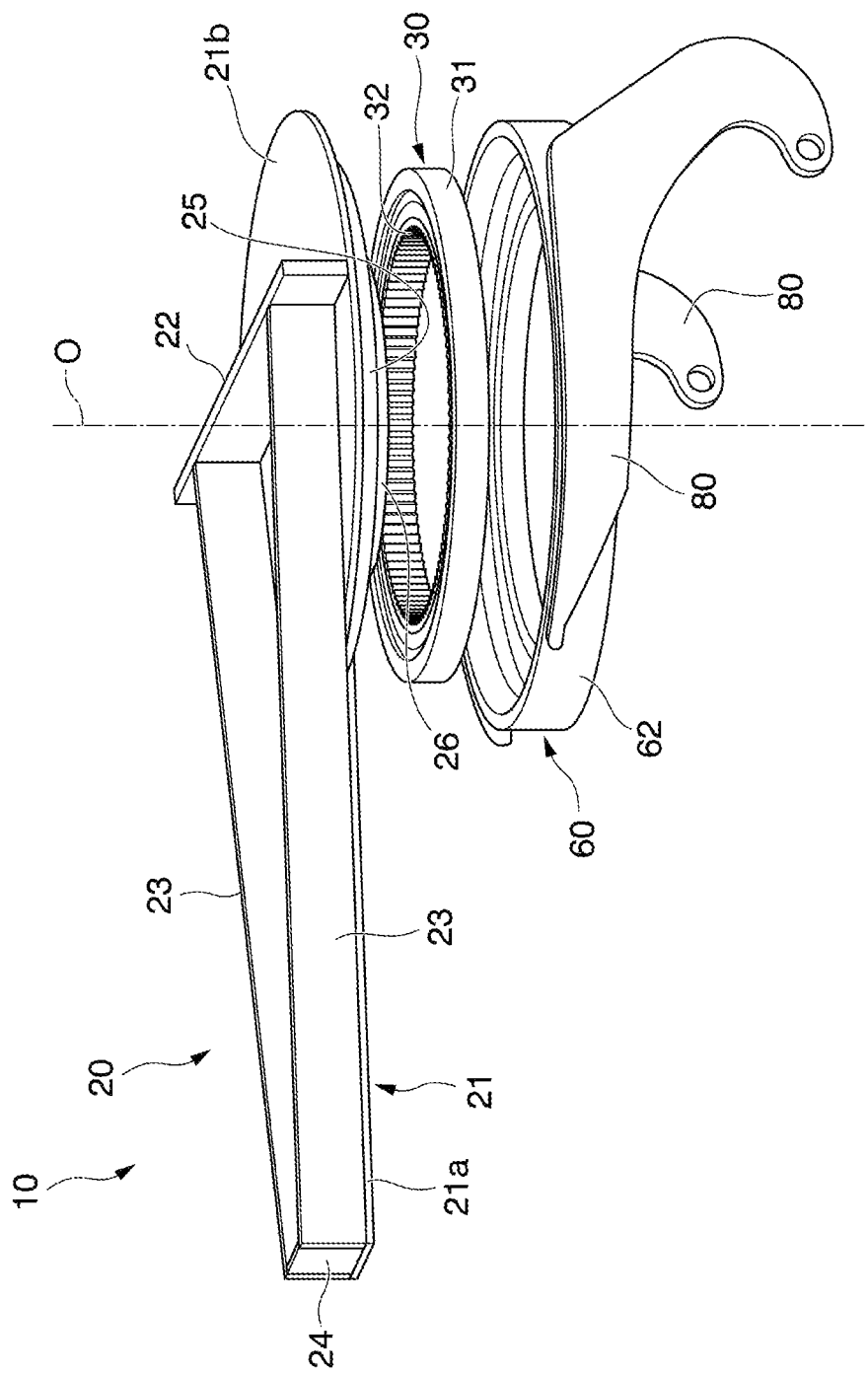
FIG. 4 is an exploded perspective view of the drawbar, a bearing, a circle and a support of the work equipment for the motor grader according to the embodiment of the present invention.
Figure 5:
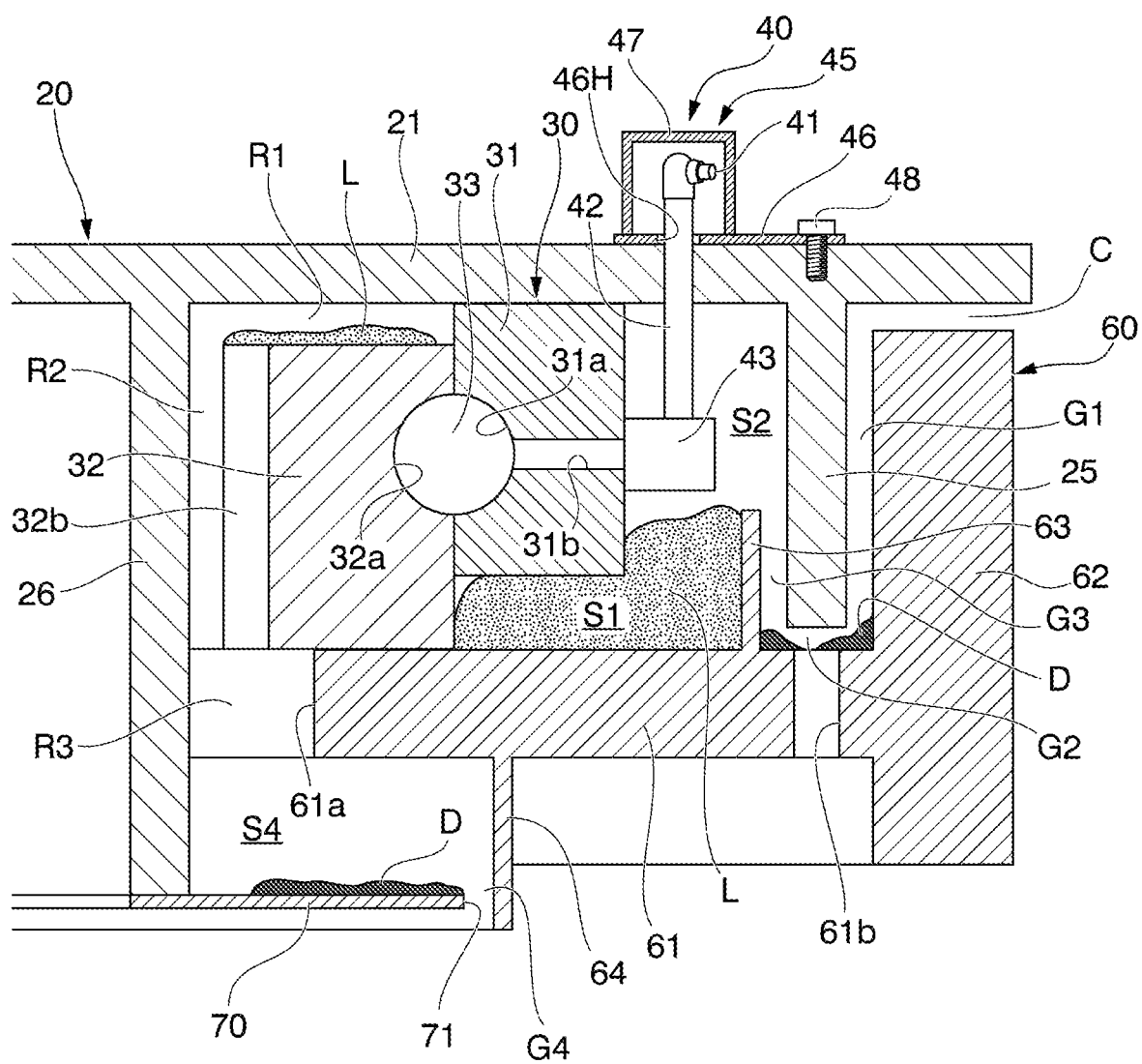
FIG. 5 is a partial longitudinal sectional view of the drawbar, bearing and circle of the work equipment for the motor grader according to the embodiment of the present invention.

As shown in FIGS. 2 to 4, the work equipment 10 includes a drawbar 20, a bearing 30, a slew motor 50, a circle 60 and a support 80 in addition to the blade 90. Further, as shown in FIG. 5, the work equipment 10 is provided with a lubricant supply unit 40 and a bottom cover 70.

<<Drawbar>>

As shown in FIGS. 2 to 4, the drawbar 20 includes a drawbar plate 21, a lateral rib 22, a vertical rib 23, an outer peripheral-side rib 25, and an inner peripheral-side rib 26.

<<Drawbar Plate>>

The drawbar plate 21 has a plate shape extending along a horizontal surface. An upper surface and a lower surface of the drawbar plate 21 has a planar shape extending along the horizontal surface. The drawbar plate 21 extends in the forward-rearward directions as a longitudinal direction. A portion on the forward side of the drawbar plate 21 is a plate front portion 21a which tapers in a forward side when seen from a plan view. A portion of the drawbar plate 21 on the rearward side is a plate rear portion 21b which is made larger in the vehicle width direction than the plate front portion 21a. The plate rear portion 21b has a shape in which, after a size in the vehicle width direction becomes gradually larger toward the rearward side from the rear end of the plate front portion 21a, a distance in the vehicle width direction becomes smaller toward the rear.

<<Lateral Rib>>

The lateral rib 22 has a plate shape protruding from an upper surface of the plate rear portion 21b in the drawbar plate 21 and extending in the vehicle width direction. The lateral rib 22 is provided at a position of the forward-rearward directions at which the vehicle width direction in the plate rear portion 21b is maximized.

<<Vertical Rib>>

The vertical rib 23 protrudes from the drawbar plate 21 and has a plate shape extending in the forward-rearward directions over the plate front portion 21a and the plate rear portion 21b of the drawbar plate 21. A pair of the vertical ribs 23 is provided at a distance from each other in the vehicle width direction. A rear end of each vertical rib 23 is connected to a front surface of the lateral rib 22. A position in the forward-rearward directions of the distal end of each vertical rib 23 coincides with the distal end of the plate front portion 21a. The pair of vertical ribs 23 is provided so that a distance in the vehicle width direction of the pair of vertical ribs 23 becomes smaller toward the forward side. A portion on the plate front portion 21a in the pair of vertical ribs 23 extends so as to coincide with a side edge portion of the plate front portion 21a in the vehicle width direction when seen from a plan view.

In a region on the drawbar plate 21, a front portion and a central portion sectioned by the pair of vertical ribs 23 and the lateral rib 22 are defined as a front portion region A1. The front portion region A1 has a motor through hole 21c which penetrates the drawbar plate 21 in the vertical direction. The motor through hole 21c is formed at a position near the center of the vehicle width direction.

In the region on the drawbar plate 21, a portion on the rearward side of the lateral rib 22 is defined as a rear portion area A2. In the region on the drawbar plate 21, a portion between a surface facing the outer side in the vehicle width direction of each vertical rib 23 and a front surface of the lateral rib 22 is defined as a side portion region A3. A pair of side portion regions A3 is formed at a distance from each other in the vehicle width direction.

A connecting portion 24 is provided between the front end of the pair of vertical ribs 23 and the front end of the drawbar plate 21. A sliding member (not shown) is connected to the connecting portion 24. The sliding member is connected to the front frame 6. The drawbar 20 is connected to each hydraulic cylinder, as will be described later. The drawbar 20 is swingable with respect to the front frame 6 in accordance with the expansion and contraction of each hydraulic cylinder.

<<Outer Peripheral-Side Rib>>

As shown in FIGS. 3 to 5, the outer peripheral-side rib 25 is provided so as to protrude downward from a lower surface of the plate rear portion 21b in the drawbar plate 21. The outer peripheral-side rib 25 has a plate shape extending in a peripheral direction of an imaginary circle (hereinafter referred to simply as a peripheral direction) centered on an axis O extending in the vertical direction. The axis O is located in a center portion of the plate rear portion 21b. The outer peripheral-side rib 25 has a plate shape in which a radial direction of the imaginary circle (hereinafter simply referred to as a radial direction) is in the thickness direction. The protruding length of the outer peripheral-side rib 25, that is, a size in the vertical direction is constant in the entire peripheral direction.

The outer peripheral-side rib 25 of the present embodiment has an annular shape centered on the axis O when seen from a plan view. The outer peripheral-side rib 25 extends so as to pass through the front portion region A1, the rear portion region A2, and the side portion region A3 in the upper surface of the drawbar 20 when seen from a plan view. That is, the outer peripheral-side rib 25 overlaps with the lateral rib 22 and the pair of vertical ribs 23 when seen from a plan view and extends across the lateral rib 22 and the pair of vertical ribs 23.

<<Inner Peripheral-Side Rib>>

As shown in FIGS. 3 to 5, the inner peripheral-side rib 26 is provided inside in the radial direction of the outer peripheral-side rib 25 in the lower surface of the drawbar plate 21. The inner peripheral-side rib 26 is provided so as to protrude downward from the lower surface of the plate rear portion 21b in the drawbar plate 21, similarly to the outer peripheral-side rib 25. The inner peripheral-side rib 26 has a plate-like shape extending in the peripheral direction. The inner peripheral-side rib 26 has a plate shape in which the radial direction is the thickness direction. The most part of the inner peripheral-side rib 26 except for a forward part of the inner peripheral-side rib 26 of the present embodiment extends in an annular shape centered on the axis O when seen from a plan view.

As shown in FIG. 3, the forward part of the inner peripheral-side rib 26 extends so as to be recessed toward the rearward side so as to avoid the motor through hole 21c when seen from a plan view. The protruding length of the inner peripheral-side rib 26, that is, a size in the vertical direction of the inner peripheral-side rib 26 is constant over the peripheral direction. As shown in FIG. 5, the protruding length of the inner peripheral-side rib 26 is longer than the protruding length of the outer peripheral-side rib 25. That is, a lower end of the inner peripheral-side rib 26 is located lower than a lower end of the outer peripheral-side rib 25.

As shown in FIG. 3, the inner peripheral-side rib 26 is extended so as to pass through front portion region A1, the rear portion region A2 and the side portion region A3 in the upper surface of the drawbar 20 in the same manner as the outer peripheral-side rib 25. That is, the outer peripheral-side rib 25 overlaps with the lateral rib 22 and the pair of vertical ribs 23 when seen from a plan view and extends across the lateral rib 22 and the pair of vertical ribs 23.

As shown in FIG. 1, the drawbar 20 is connected to the front frame 6 by a hydraulic cylinder such as a pair of left and right lift cylinders 101 and drawbar shift cylinders 102. By the pair of lift cylinders 101, the drawbar 20 is capable of being lifted and lowered and being swung around an axis along the forward-rearward directions. The drawbar shift cylinder 102 allows the drawbar 20 to be moved in left and right directions relative to the front frame 6.

<<Bearing>>

Figure 6:
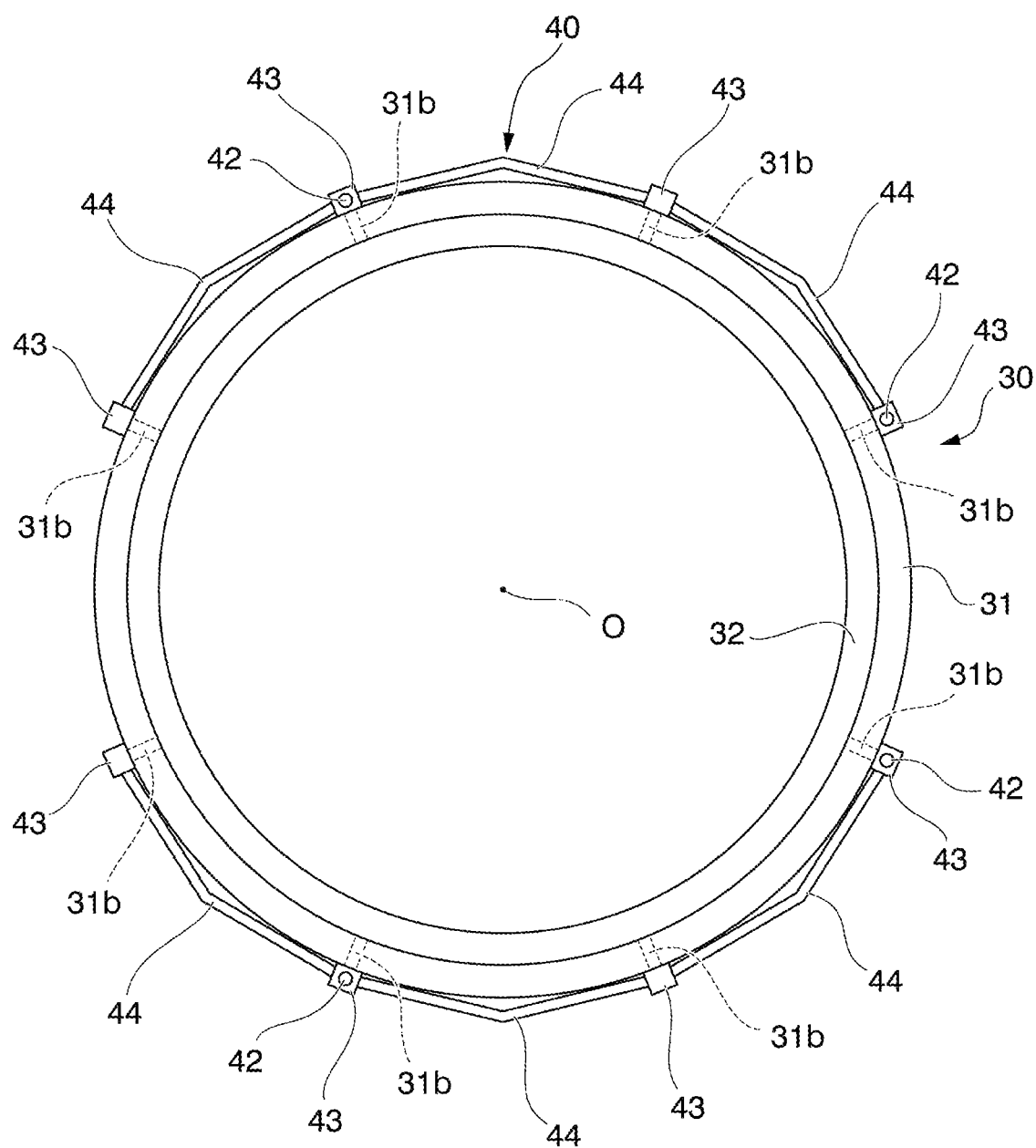
FIG. 6 is a plan view showing a bearing, a connection portion, and a peripheral-direction pipe of the work equipment for a motor grader according to the embodiment of the present invention.

As shown in FIGS. 4 to 6, the bearing 30 is a member having an annular shape centered on the axis O, and is provided in a space between the drawbar 20 and the circle 60 below the drawbar 20. As shown in FIG. 5, the bearing 30 is provided so as to be sandwiched between the outer peripheral-side rib 25 and the inner peripheral-side rib 26 below the drawbar 20, and is interposed between the outer peripheral-side rib 25 and the inner peripheral-side rib 26. The bearing 30 includes an outer ring 31, an inner ring 32, and a rolling body 33.

<<Outer Ring>>

As shown in FIGS. 4 and 6, the outer ring 31 is a member having an annular shape centered on the axis O when seen from a plan view. As shown in FIG. 5, the outer ring 31 has a rectangular cross section which is orthogonal to the peripheral direction. An upper-end surface of the outer ring 31 has a flat shape along a horizontal surface. The upper-end surface of the outer ring 31 is fixed to the lower surface of the plate rear portion 21b in the drawbar 20 over the peripheral direction. The outer ring 31 is fixedly integrated with the drawbar plate 21 by a plurality of bolts (not shown) passing through the drawbar plate 21 vertically and arranged in the peripheral direction. The outer ring 31 is provided between the outer peripheral-side rib 25 and the inner peripheral-side rib 26 on the lower surface of the drawbar plate 21. The lower end surface of the outer ring 31 has a flat shape along a horizontal surface. The lower end surface of the outer ring 31 is located above the lower end of an outer peripheral-side wall portion 62.

An inner peripheral surface and an outer peripheral surface of the outer ring 31 have a cylindrical shape which is parallel to the axis O. In the inner peripheral surface of the outer ring 31, an outer ring recessed groove 31a recessed from the inner peripheral surface and extending over the peripheral direction is formed. In the outer ring 31, a plurality of supply holes 31b (eight supply holes in the present embodiment) passing through the inner peripheral surface and the outer peripheral surface of the outer ring 31 in the radial direction are formed at a distance from each other in the peripheral direction.

The outer peripheral surface of the outer ring 31 faces the inner peripheral surface of the outer peripheral-side rib 25 of the drawbar 20 at a distance inside in the radial direction from the inner peripheral surface of the outer peripheral-side rib 25. Thus, the outer peripheral-side space S2 is formed between the outer peripheral surface of the outer ring 31 and the inner peripheral surface of the outer peripheral-side rib 25 of the drawbar 20.

<<Inner Ring>>

As shown in FIGS. 4 and 6, the inner ring 32 is a member having an annular shape centered on the axis O when seen from a plan view. The inner ring 32 has a diameter smaller than that of the outer ring 31 and is disposed inside of the outer ring 31 in the radial direction. As shown in FIG. 5, the inner ring 32 has a rectangular cross section which is orthogonal to the peripheral direction. An upper-end surface of the inner ring 32 is located one step lower than the upper-end surface of the outer ring 31. Thus, the portion space R1 is formed between the upper-end surface of the inner ring 32 and the lower surface of the drawbar plate 21. The lower-end surface of the inner ring 32 is located one step lower than the lower-end surface of the outer ring 31.

The outer peripheral surface of the inner ring 32 has a cylindrical shape centered on the axis O. The outer peripheral surface of the inner ring 32 is disposed with a slight clearance with respect to the inner peripheral surface of the outer ring 31. An inner ring recessed groove 32a recessed inside in the radial direction from the outer peripheral surface and extending over the peripheral direction is formed on the outer peripheral surface of the inner ring 32. A position in the vertical direction of the inner ring recessed groove 32a corresponds to the position in the vertical direction of the outer ring recessed groove 31a.

On a portion in the inner peripheral side of the inner ring 32, inner gear teeth 32b in which irregularities are continuous in the peripheral direction so as to form an annular shape centered on the axis O are formed over the peripheral direction and the vertical direction. The inner gear teeth 32b of the inner ring 32 are arranged at a distance in the radial direction from the outer peripheral surface of the inner peripheral-side rib 26 of the drawbar 20. A space between the inner gear teeth 32b of the inner ring 32 and the inner peripheral-side rib 26 of the drawbar 20 is defined as an inner peripheral-side space R2 extending in the vertical direction and the peripheral direction. An upper end of the inner peripheral-side space R2 is connected to the upper portion space R1.

<<Rolling Body>>

The rolling body 33 is provided between the outer ring 31 and the inner ring 32, and is a member that makes the outer ring 31 and the inner ring 32 be capable of rotating relatively to each other in the peripheral direction by sliding contact with the outer ring 31 and the inner ring 32. The rolling body 33 of the present embodiment is a ball having a spherical shape. A plurality of rolling bodies 33 are accommodated in the accommodating space sectioned by the outer ring recessed groove 31a and the inner ring recessed groove 32a over the peripheral direction. As the rolling body 33, a rod-shaped roller may be used. In this case, a plurality of rollers are arranged over the peripheral direction with a center axis of each roller directing the vertical direction.

<<Lubricant Supply Unit>>

As shown in FIGS. 5 and 6, the lubricant supply unit 40 is a member for supplying a lubricant between the outer ring 31 and the inner ring 32 in the bearing 30. The lubricant supply unit 40 includes a lubricant inlet port 41, a penetration pipe 42, a connection portion 43, a peripheral-direction pipe 44, and a cover member 45.

<<Lubricant Inlet Port>>

The lubricant inlet port 41 shown in FIG. 5 is a so-called grease nipple. In the present embodiment, a grease L is employed as a lubricant, and the grease L is pumped to the lubricant inlet port 41 from the outside, whereby the grease L is supplied to the bearing 30.

A plurality of lubricant inlet ports 41 are provided on the drawbar plate 21. As shown in FIG. 3, a plurality of (four in the present embodiment) lubricant inlet ports 41 are provided at a distance from each other in the peripheral direction. The lubricant inlet port 41 is provided in the side portion region A3 and the rear portion region A2 on the draw bar plate 21. In the present embodiment, one lubricant inlet port 41 is provided in each side portion region A3, and two lubricant inlet ports 41 are provided in rear portion region A2 so as to be at a distance from each other in the vehicle width direction. In other words, four lubricant inlet ports 41 are provided in total. Each lubricant inlet port 41 is located on the same circle centered on the axis O. In the present embodiment, two lubricant inlet ports 41 are provided on one side in the vehicle width direction with an axis along the forward-rearward directions when seen from a plan view as a line of symmetry. As shown in FIG. 5, each lubricant inlet port 41 is disposed outside in the radial direction and upward of the outer ring 31.

<<Penetration Pipe>>

As shown in FIG. 5, the penetration pipe 42 is a pipe extending in the vertical direction so as to penetrate the drawbar plate 21 vertically. Four penetration pipes 42 are provided so as to correspond to the lubricant inlet ports 41. The penetration pipe 42 is provided at the same position as the lubricant inlet port 41 when seen from a plan view. An upper end of the penetration pipe 42 is connected to the lubricant inlet port 41 so as to communicate therewith. That is, the lubricant inlet port 41 is provided on the drawbar plate 21 by being supported by the upper end of the penetration pipe 42. The lubricant inlet port 41 may be fixed to and supported by the upper surface of the drawbar plate 21. A lower portion of the penetration pipe 42 is located in the outer peripheral-side space S2.

<<Connection Portion>>

As shown in FIG. 5, the connection portion 43 is provided in the outer peripheral-side space S2, and is attached to the opening portion of each lubricant supply hole 31b in the outer peripheral surface of the outer ring 31. In FIG. 6, in forward-rearward directions, the left side of FIG. 6 is shown as a front of the motor grader 1, and the right side of FIG. 6 is shown as a rear of the motor grader 1. As shown in FIG. 6, a total of eight connection portions 43 are provided so as to correspond to the lubricant supply holes 31b. Four connection portions 43 are each provided along the outer peripheral surface of the outer ring 31 on both sides in the vehicle width direction (vertical direction in FIG. 6).

In an upper end of part of the connection portion 43 of the plurality of connection portions 43, the lower end of the penetration pipe 42 is connected. In the present embodiment, as shown in FIG. 6, the lower end of the penetration pipe 42 is connected only to the connection portion 43 which is a second one from the front and the connection portion 43 which is the most rearward one among the four connecting portions 43 on one side in the vehicle width direction.

The connection portion 43 connected to the lower end of the penetration pipe 42 connects the penetration pipe 42 and the lubricant supply hole 31b to each other so as to communicate with each other. As a result, the lubricant introduced from the lubricant inlet port 41 is supplied to the lubricant supply hole 31b through the penetration pipe 42 and the connection portion 43.

<<Peripheral-Direction Pipe>>

As shown in FIG. 6, the peripheral-direction pipe 44 connects mutually the adjacent connection portions 43 in the peripheral direction. The peripheral-direction pipe 44 is provided between the connecting portions 43 adjacent in the forward-rearward directions so as to sequentially connect in the forward-rearward directions the four connecting portions 43 provided on each side in the vehicle width direction. The peripheral-direction pipe 44 is not provided between four connection portions 43 on one side in the vehicle width direction and four connection portions 43 on the other side of the vehicle width direction. The peripheral-direction pipe 44 extends in the peripheral direction along the outer peripheral surface of the outer ring 31. The peripheral-direction pipe 44 may be a pipe made of a metal or a pipe made of a material having elasticity such as rubber.

The connection portion 43 to which the lower end of the penetration pipe 42 is connected and the connection portion 43 to which the penetration pipe 42 is not connected are communicated with each other in the peripheral-direction pipe 44. Thus, the lubricant from the connection portion 43 to which the lower end of the penetration pipe 42 is connected is introduced into the connection portion 43 to which the penetration pipe 42 is not connected through the peripheral-direction pipe 44. The connection portion 43 to which the penetration pipe 42 is not connected introduces the lubricant introduced from the peripheral-direction pipe 44 into the lubricant supply hole 31b of the outer ring 31. That is, the connection portion 43 to which the penetration pipe 42 is not connected connects the peripheral-direction pipe 44 and the lubricant supply hole 31b to each other so as to communicate with each other.

The peripheral-direction pipe 44 of the present embodiment is connected to an end portion on the outer peripheral side of the lubricant supply hole 31b of the outer ring 31 via the connection portion 43. The connection portion 43 may be formed as part of the peripheral-direction pipe 44. The peripheral-direction pipe 44 may be directly connected to the lubricant supply hole 31b without passing through the connection portion 43. In this case, at a corresponding place where the connection portion 43 to which the lower end of the penetration pipe 42 is connected is present in the above, the lower end of the penetration pipe 42 is directly connected to the peripheral-direction pipe 44.

<<Cover Member>>

As shown in FIG. 2 and FIG. 5, the cover member 45 is detachably attached to the upper surface of the drawbar plate 21 so as to cover each of the lubricant inlet ports 41. The cover member 45 has a flange 46 and a cover member main body 47, and is fixed to the drawbar plate 21 by a bolt 48.

The flange 46 is provided at a position corresponding to the lubricant inlet port 41 and the penetration pipe 42 in the upper surface of the drawbar plate 21. The flange 46 has a plate shape along the upper surface of the drawbar plate 21, and a through hole 46H through which the penetration pipe 42 passes is formed. A bolt hole through which the bolt 48 is inserted are formed outside in the radial direction of the lubricant inlet port 41 and the penetration pipe 42 in the flange 46.

The cover member main body 47 is integrally fixed to an upper surface of the flange 46, and covers the lubricant inlet port 41 from above and from the side. The cover member main body 47 extends upward from the periphery of the hole portion through which the penetration pipe 42 is inserted to have a cylindrical shape and an upper end of the cover member main body is closed.

The bolt 48 is provided so as to insert the bolt hole of the flange 46 from above, and a lower portion of the bolt is fixed to the bolt fixing hole formed in the drawbar plate 21. By attaching and detaching the bolt 48, the flange 46 and the cover member main body 47 can be attached and detached.

<<Slew Motor>>

As shown in FIGS. 2 and 3, the slew motor 50 is provided so as to pass through the motor through hole 21c of the drawbar plate 21 vertically. The slew motor 50 is integrally fixed to the drawbar plate 21 via a bolt (not shown). As shown in FIG. 2, a pinion 51 is provided on a lower portion of the slew motor 50. The pinion 51 is capable of being rotatably driven about an axis extending in the vertical direction below the drawbar plate 21. Gear teeth are formed on an outer peripheral surface of the pinion 51, and are engaged with the inner gear teeth 32b of the inner ring 32.

<<Circle>>

As shown in FIGS. 2, 3 and 5, the circle 60 is provided so as to be rotatable about the axis O through the bearing 30 below the drawbar 20. The circle 60 includes a circle plate 61, an outer peripheral-side wall portion 62, an inner peripheral-side wall portion 63, and a lower-side wall portion 64.

<<Circle Plate>>

The circle plate 61 has an annular shape centered on the axis O when seen from a plan view and has a plate shape extending in the horizontal direction. An upper surface and a lower surface of the circle plate 61 has a planar shape along the horizontal surface. As shown in FIG. 5, the circle plate 61 is fixed to the lower end surface of the inner ring 32 by a fixing member (not shown) such as bolts over the peripheral direction. As a result, the circle plate 61 rotates about the axis O integrally with the inner ring 32. That is, the circle plate 61 is relatively rotatable with respect to the drawbar plate 21 about the axis O via the bearing 30. The lower surface of the circle plate 61 is located above the lower end of the inner peripheral-side rib 26 of the drawbar 20.

An inner peripheral edge portion 61a of the circle plate 61 has a circular shape centered on the axis O. The inner peripheral edge portion 61a of the circle plate 61 faces the outer peripheral surface of the inner peripheral-side rib 26 of the drawbar 20 from an outside in the radial direction. Thus, a communication space R3 is formed between the inner peripheral edge portion 61a of the circle plate 61 and the outer peripheral surface of the inner peripheral-side rib 26 of the drawbar 20 to communicate the inner peripheral-side space R2 downward over the peripheral direction.

A position in the radial direction of the inner peripheral edge portion 61a of the circle plate 61 is located between the inner gear teeth 32b of the inner ring 32 and the outer peripheral surface of the inner ring 32. The circle plate 61 is arranged so as to protrude outward in the radial direction from the inner peripheral edge portion 61a. The circle plate 61 extends outward in the radial direction rather than the outer peripheral-side rib 25 of the drawbar 20.

The upper surface of the circle plate 61 and the lower end of the outer peripheral-side rib 25 of the drawbar 20 face at a distance from each other in the vertical direction. A lower-side gap G2 extending in the radial direction and the peripheral direction is formed between the upper surface of the circle plate 61 and the lower end of the outer peripheral-side rib 25 of the drawbar 20.

The upper surface of the circle plate 61 and the lower end surface of the outer ring 31 face at a distance from each other in the vertical direction. A distance between the upper surface of the circle plate 61 and the lower end surface of the outer ring 31 is larger than a distance of the lower-side gap G2 in the vertical direction.

<<Outer Peripheral-Side Wall Portion>>

The outer peripheral-side wall portion 62 has a cylindrical shape centered on the axis O. The inner peripheral surface of the outer peripheral-side wall portion 62 is connected to the outer peripheral side of the circle plate 61. The outer peripheral-side wall portion 62 extends from the outer periphery of the circle plate 61 both upward and downward. The outer peripheral-side wall portion 62 surrounds the bearing 30 from the outer peripheral side thereof. The upper end of the outer peripheral-side wall portion 62 faces the lower surface of the drawbar plate 21 at a distance from the lower surface of the drawbar plate 21 in the vertical direction. That is, a clearance C which penetrates in the radial direction over the peripheral direction is formed between the upper end of the outer peripheral-side wall portion 62 and the lower surface of the drawbar plate 21.

The inner peripheral surface of the outer peripheral-side wall portion 62 faces the outer peripheral surface of the outer peripheral-side rib 25 of the drawbar 20 at a distance from the outer peripheral surface of the outer peripheral-side rib 25 in the radial direction. As a result, an outer peripheral-side gap G1, an upper end of which is communicated with the clearance C, and which extends over the vertical direction and the peripheral direction, is formed between the outer peripheral-side wall portion 62 and the outer peripheral-side rib portion 25. The lower end of the outer peripheral-side gap G1 is connected to the end portion outside in the radial direction of the lower-side gap G2.

<<Inner Peripheral-Side Wall Portion>>

As shown in FIG. 5, the inner peripheral-side wall portion 63 protrudes from the upper surface of the circular plate 61 at a position in the radial direction between the outer ring 31 of the bearing 30 and the outer peripheral-side rib 25, and extends in the peripheral direction. The inner peripheral-side wall portion 63 has a circular shape centered on the axis O when seen from a plan view.

The upper end of the inner peripheral-side wall portion 63 faces the lower surface of the drawbar plate 21 at a distance from the lower surface of the drawbar plate 21 in the vertical direction. The upper end of the inner peripheral-side wall portion 63 is located below the lower end of the connection portion 43 in the lubricant supply unit 40. The upper end of the inner peripheral-side wall portion 63 is located above the lower end surface of the outer ring 31. Accordingly, the inner peripheral surface of the inner peripheral-side wall portion 63 faces the outer peripheral surface of the outer ring 31 in the radial direction.

The upper end of the inner peripheral-side wall portion 63 is located above the lower end of the outer peripheral-side rib 25 of the drawbar 20. The outer peripheral surface of the inner peripheral-side wall portion 63 faces the inner peripheral surface of the outer peripheral-side rib 25 of the drawbar 20 at a distance from the inner peripheral surface of the outer peripheral-side rib 25 in the radial direction. As a result, an inner peripheral-side gap G3 extending over the vertical direction and the peripheral direction is formed between the inner peripheral-side wall portion 63 and the outer peripheral-side rib 25. The lower end of the inner peripheral-side gap G3 is connected to the end portion inside in the radial direction of the lower-side gap G2. As a result, the inner peripheral-side gap G3 communicates with the outer peripheral-side gap G1 through the lower-side gap G2. The upper end of the inner peripheral-side gap G3 communicates with the outer peripheral-side space S2.

The inner peripheral-side wall portion 63 is located outside in the radial direction the connection portion 43 and the peripheral-direction pipe 44 in the lubricant supply unit 40. The upper end of the inner peripheral-side wall portion 63 is located below the connection portion 43 and the peripheral-direction pipe 44 in the lubricant supply unit 40.

<<Discharge Hole>>

As shown in FIG. 5, a discharge hole 61b vertically passing through the circle plate 61 is formed in a portion between the outer peripheral-side wall portion 62 and the inner peripheral-side wall portion 63 of the circle plate 61. A plurality of discharge holes 61b are formed in a peripheral direction at a distance from each other. Each discharge hole 61b communicates the lower-side gap to the lower side of the circle plate 61. A lower end of the outer peripheral-side rib 25 of the drawbar 20 is located above an opening portion of the discharge hole 61b in the upper surface of the circle plate 61. That is, the discharge hole 61b is formed at a position facing the lower end of the outer peripheral-side rib 25 from below. An inner diameter of the discharge hole 61b is larger than a size in the vertical direction of the lower-side gap G2.

<<Lower-Side Wall Portion>>

As shown in FIG. 5, the lower-side wall portion 64 protrudes downward from the lower surface of the circle plate 61 and extends in the peripheral direction. The lower-side wall portion 64 has a circular shape centered on the axis O when seen from a plan view. A position of the lower-side wall portion 64 in the radial direction is located between the inner peripheral edge portion 61a and the inner peripheral-side wall portion 61 of the circle plate 63. The position of the lower-side wall portion 64 in the radial direction is located outside from the outer peripheral surface of the inner ring 32 in the radial direction.

<<Bottom Cover>>

The bottom cover 70 shown in FIG. 5 has an annular shape centered on the axis O when seen from a plan view and has a plate shape extending in the horizontal direction. The upper surface and the lower surface of the bottom cover 70 has a planar shape along the horizontal surface. The bottom cover 70 is fixed to the lower end of the inner peripheral-side rib 26 of the drawbar 20 by bolts (not shown) over the peripheral direction. The bottom cover 70 may be fixed to the inner peripheral-side rib 26 via a bracket or the like. The bottom cover 70 may be configured to be segmented into a plurality of parts in a peripheral direction.

The inner periphery of the bottom cover 70 is disposed along the inner peripheral-side rib 26. The bottom cover 70 extends outward in the radial direction from a fixing portion with the inner peripheral-side rib 26. The outer peripheral edge portion 71 of the bottom cover 70 faces the inner peripheral surface of the lower-side wall portion 64 of the circle 60 from an inside in the radial direction. As a result, a bottom gap G4 passing through vertically over the peripheral direction is formed between the outer peripheral edge portion 71 of the bottom cover 70 and the inner peripheral surface of the lower-side wall portion 64. The lower end of the lower-side wall portion 64 is located below the bottom cover 70.

A space sectioned by the outer peripheral surface of the inner peripheral-side rib 26, the lower surface of the circle plate 61, the inner peripheral surface of the lower-side wall portion 64 and the upper surface of the bottom cover 70 is defined as a bottom space R4. The bottom space R4 communicates with the inner peripheral-side space R2 through the communication space R3. The bottom space R4 communicates downwardly through the bottom gap G4.

<<Support>>

As shown in FIG. 2, a pair of supports 80 is fixed to the outer peripheral surface of the outer peripheral-side wall portion 62, which becomes the outer peripheral surface of the circle 60, at a distance from each other in the vehicle width direction. Each support 80 extends rearward along the outer peripheral surface of the circle 60, and then, extends and curves downward.

<<Blade>>

The blade 90 extends horizontally below the circle 60. The blade 90 is supported by the pair of supports 80. That is, the blade 90 is supported by the circle 60 through the supports 80. The blade 90 is relatively movable in an extension direction of the blade 90 with respect to the circle 60 by a blade shift cylinder (not shown). The drawbar 20 is swingable about an axis along the extending direction of the blade 90 by a tilt cylinder 103 shown in FIG. 1.

<Operation and Effects>

In the work equipment 10 of the motor grader 1 of the above-described configuration, when the pinion 51 is rotated by the driving of the slew motor 50, the inner ring 32 in which the inner gear teeth 32b are engaged with the pinion 51 is relatively rotated with respect to the outer ring 31 about the axis O. As a result, the circle 60 integrally fixed to the inner ring 32 is rotated about the axis O, and the blade 90 supported by the circle 60 via the support 80 is rotated about the axis O. Accordingly, by adjusting a rotation angle of the pinion 51 of the slew motor 50, a propulsion angle of the blade 90 can be set arbitrarily.

In the sliding portion between the outer ring 31 and the inner ring 32, it is necessary to supply the grease L as a lubricant to smoothly rotate the outer ring 31 and the inner ring 32 relative to each other. The supply of the grease L is carried out via the lubricant supply unit 40.

When the grease L is supplied, the bolt 48 of the cover member 45 shown in FIG. 5 is removed, whereby the flange 46 and the cover member 45 are removed, and the lubricant inlet port 41 is exposed at the upper surface of the drawbar plate 21. The grease L is pumped to each lubricant inlet port 41 by a grease gun. As a result, the grease L is introduced into each of the lubricant supply holes 31b of the outer ring 31 through the penetration pipe 42, the connection portion 43, and the peripheral-direction pipe 44. Then, the grease L flows through the lubricant supply hole 31b of the outer ring 31 inward in the radial direction, so that the grease L is supplied to the rolling bodies 33 which is a sliding portion between the outer ring 31 and the inner ring 32. As a result, lubrication at the sliding portion is ensured. Part of the grease L supplied to the sliding portion is discharged to upper and lower sides of the bearing 30 through a clearance between the outer ring 31 and the inner ring 32.

The grease L discharged to the lower side of the bearing 30 is introduced into the lower portion space S1. Since the inner peripheral-side wall portion 63 of the circle 60 is located outside the lower portion space S1 in the radial direction, the grease L is temporarily stored in the lower portion space S1 as the inner peripheral-side wall portion 63 being a dam. When grease L is filled in the lower portion space S1 by the grease L being sequentially discharged downward from the bearing 30, part of the grease L passes over the inner peripheral-side wall part 63. The grease L passing over the inner peripheral-side wall portion 63 reaches the lower-side gap G2 by passing through the inner peripheral-side gap G3 between the inner peripheral-side wall portion 63 and the outer peripheral-side rib 25, and then, the grease L is discharged to an outside of the work equipment 10 through the discharge hole 61b.

On the other hand, the grease L discharged to the upper portion of the bearing 30 is introduced into an upper portion space R1, and is introduced on the upper-end surface of the inner ring 32. The grease L is sequentially discharged upward from the bearing 30, whereby the grease L in the upper-end surface of the inner ring 32 is pushed out inward in the radial direction, dropped to the bottom space R4 through the inner peripheral-side space R2 and the communication space R3, and then discharged to the lower side of the work equipment 10 through the bottom gap G4.

Here, in the present embodiment, when the grease L is introduced into the lubricant inlet port 41 provided as a minimum arrangement number, the grease L is introduced into the plurality of lubricant supply holes 31b of the outer ring 31 through the peripheral-direction pipe 44 connected to the lubricant inlet port 41. That is, the grease L can be collectively introduced into the plurality of lubricant supply holes 31b arranged at a distance from each other in the peripheral direction through the peripheral-direction pipe 44. As a result, the grease L is introduced between the outer ring 31 and the inner ring 32 from each lubricant supply hole 31b, whereby the grease L can be easily supplied to a wide area in the peripheral direction between the outer ring 31 and the inner ring 32. Therefore, it is possible to avoid complicated grease feeding work such as operating the grease gun while moving frequently in order to supply the grease L to the entire peripheral area of the bearing 30.

The lubricant inlet port 41 is located on the drawbar plate 21 and is capable of introducing the grease L into the peripheral-direction pipe 44 via a penetration pipe 42 penetrating through the drawbar plate 21. If it is supposed that the lubricant inlet port 41 is located below the drawbar plate 21 and below the circle plate 61, the operator needs to go under the work equipment 10 to perform the grease feeding work with the lubricant. In the present embodiment, since the lubricant inlet port 41 is located on the drawbar plate 21 where the grease L can be introduced with the operator in a standing posture, it is possible to perform the grease feeding work without forcing an unreasonable posture to the operator.

Further, the lubricant inlet port 41 is provided in the side portion region A3 and the rear portion region A2 on the drawbar plate 21 to which the operator is ease to access from the outside of the drawbar plate 21. When the lubricant inlet port 41 is in the front portion area A1 on the drawbar plate 21, the pair of vertical ribs 23 interferes with the grease feeding work of the grease L. In the present embodiment, since the lubricant inlet port 41 is provided in the side portion region A3 and the rear portion region A2 having no structure when viewed from the outer peripheral side of the drawbar plate 21, the work can be easily performed.

Here, depending on the working environment of the motor grader 1, dirt and water (hereinafter, referred to as dirt D) may fall down to the work equipment 10. In the present embodiment, when the grease feeding work of the grease L is not performed, the lubricant inlet port 41 is covered with the cover member 45 from the outside, so that the dirt D never falls down to the lubricant inlet port 41. Therefore, when performing the grease feeding work, the grease gun can be attached to the lubricant inlet port 41 without performing the cleaning work of the lubricant inlet port 41. Further, it is possible to prevent the dirt D from being mixed into the grease L supplied to the bearing 30 during the grease feeding work. Further, although the through hole 46H for inserting the penetration pipe 42 is provided in drawbar plate 21, when the grease feeding work is not performed, the lubricant inlet port 41 of the upper end of the through piping 42 is covered by cover member 45 from the outside, so that the entering of dirt or water from the through hole 46H provided in drawbar plate 21 to outer peripheral-side space S2 can be prevented.

The clearance C is formed between the drawbar plate 21 and the upper end of the outer peripheral-side wall portion 62 of the circle 60 to allow the relative rotation therebetween. When the dirt D entering an inside portion of the work equipment 10 through the clearance C reaches the bearing 30, the dirt D is caught between the outer ring 31 and the inner ring 32, thereby causing premature wear of the bearing 30.

On the other hand, in the present embodiment, the inner peripheral-side wall portion 63 protruding upward from the circle plate 61 is formed between the clearance C and the bearing 30. As a result, the dirt D which has flowed into the inside portion through the clearance C is introduced into a portion between the outer peripheral-side wall portion 62 and the inner peripheral-side wall portion 63. At this time, since the progress of the dirt D is prevented by the inner peripheral-side wall portion 63, it is possible to prevent the dirt D that has passed through the clearance C from directly reaching the bearing 30.

The grease L leaked downward from between the outer ring 31 and the inner ring 32 is stored in the lower portion space S1 inside the inner peripheral-side wall portion 63. By closing the path of the dirt D to the bearing 30 by the grease L accumulated in this manner, it is possible to suppress the progress of the dirt D. Therefore, even when the dirt D passes over the inner peripheral-side wall portion 63, it is possible to suppress the dirt D from reaching the bearing 30.

In the grease L that has been accumulated in the lower portion space S1 as described above, the dirt that has entered through the clearance C may be mixed. In the present embodiment, the upper end of the inner peripheral-side wall portion 63 is located below the peripheral-direction pipe 44 and the connection portion 43 and outside the peripheral-direction pipe 44 and the connection portion 43 in the radial direction. Therefore, the peripheral-direction pipe 44 and the connection portion 43 are not immersed in the accumulated grease L. As a result, the dirt mixed in the grease L can be prevented from entering the peripheral-direction pipe 44 and the connection portion 43.

In the present embodiment, the outer peripheral-side wall portion 62, the inner peripheral-side wall portion 63, and the outer peripheral-side rib 25 form the outer peripheral-side gap G1, the lower-side gap G2, and the inner peripheral-side gap G3 which are arranged so as to be sequentially communicated with each other from the clearance C. That is, in the present embodiment, a labyrinth-like structure including the outer peripheral-side gap G1, the lower-side gap G2, and the inner peripheral-side gap G3 is formed. Therefore, it is possible to prevent the dirt D entering inside through the clearance C from being mixed into the grease L accumulated in the lower portion space S1. Therefore, it is possible to further prevent the dirt from entering into the peripheral-direction pipe 44 and the connection portion 43 through the connecting portions of the peripheral-direction pipe 44 and the connection portion 43.

Other Embodiments

Although the present embodiment of the present invention has been described above, the present invention is not limited thereto, and may be appropriately changed without departing from the technical idea of the present invention.

In the embodiment, grease L is used as lubricant to be fed to the bearing 30 via the lubricant supply unit 40, but other lubricant such as lubricating oil having lower viscosity than that of the grease L may be used.

In the embodiment, an example of providing the outer peripheral-side rib 25, the inner peripheral-side rib 26, and the inner peripheral-side wall portion 63 on the drawbar 20 is explained; however, any one of them may not be provided. The discharge hole 61b of the circle plate 61 is not limited to an example formed between the outer peripheral-side wall portion 62 and the inner peripheral-side wall portion 63, and may be formed in other portion such as an inside in the radial direction of the inner peripheral-side wall portion 63. Further, the discharge hole 61b may not be provided. Further, the bottom cover 70 may not be provided.

The lubricant inlet port 41 needs to be provided in at least one of: the side portion region A3 on the right side in the vehicle width direction; the side portion region A3 on the left side in the vehicle width direction; and the rear portion region A2, on the drawbar plate 21.

When the lubricant inlet port 41 is provided in any one of a pair of side portion regions A3 and rear portion region A2 on the drawbar plate 21, a plurality of peripheral-direction pipes 44 are provided in the peripheral direction of the outer ring 31 while interposing the connection portion 43 therebetween. According to the above, it is possible to introduce the grease L into each of the lubricating oil supply holes 31b to which the connection portions 43 are connected from the one lubricant inlet port 41.

INDUSTRIAL APPLICABILITY

According to the work equipment for the motor grader of the present invention, the lubricant can be easily supplied to the bearing.

EXPLANATION OF REFERENCE SIGN

1: Motor Grader,
2: Traveling Wheels (Front Wheels),
3: Traveling Wheels (Rear Wheels),
4: Vehicle Body Frame,
5: Rear Frame,
6: Front Frame,
6a: Counter Weight,
7: Exterior Cover,
8: Cab,
10: Working Equipment,
20: Drawbar,
21: Drawbar Plate,
21a: Plate Front Portion,
21b: Plate Rear Portion,
21c: Motor Through Hole,
22: Lateral Rib,
23: Vertical Rib,
24: Connecting Portion,
25: Outer Peripheral-side Rib,
26: Inner Peripheral-side Rib,
30: Bearing,
31: Outer Ring,
31a: Outer Ring Recessed Groove,
31b: Lubricant Supply Hole,
32: Inner Ring,
32a: Inner Ring Recessed Groove,
32b: Inner Gear Teeth,
33: Rolling Body,
40: Lubricant Supply Unit,
41: Lubricant Inlet Port,
42: Penetration Pipe,
43: Connection Portion,
44: Peripheral-Direction Pipe,
45: Cover Member,
46: Flange,
46H: Through Hole,
47: Cover Member Main Body.
48: Bolt
50: Slew Motor,
51: Pinion,
60: Circle,
61: Circle Plate,
61a: Inner Peripheral Edge Portion,
61b: Discharge Hole,
62: Outer Peripheral-side Wall Portion,
63: Inner Peripheral-side Wall Portion,
64: Lower-side Wall Portion,
70: Bottom Cover,
71: Outer Peripheral Edge Portion,
80: Support,
90: Blade,
101: Lift Cylinder,
102: Drawbar Shift Cylinder,
103: Tilt Cylinder,
A1: Front Portion Region,
A2: Rear Portion Region,
A3: Side Portion Region,
C: Clearance,
G1: Outer Peripheral-side Gap,
G2: Lower-side Gap,
G3: Inner Peripheral-side Gap,
G4: Bottom Gap,
R1: Upper Portion Space,
R2: Inner Peripheral-side Space,
R3: Communication Space,
R4: Bottom Space,
S1: Lower Portion Space,
S2: Outer Peripheral-side Space,
O: Axis,
L: Grease,
D: Dirt

The invention claimed is:

1. A work equipment for a motor grader comprising:
   a drawbar that has a drawbar plate extending along a horizontal surface;
   a bearing that has an outer ring and an inner ring, the outer ring having an annular shape when seen from a plan view, fixed to a lower surface of the drawbar plate, and having a plurality of lubricant supply holes penetrating in a radial direction and disposed at a distance from each other in a peripheral direction, and an inner ring having an annular shape when seen from a plan view, disposed inside the outer ring, and connected so as to be rotatable in the peripheral direction with respect to the outer ring;
   a circle that has a circle plate fixed to a lower end of the inner ring over the peripheral direction;
   a blade that is supported by the circle;
   a peripheral-direction pipe that extends in the peripheral direction of the outer ring along an outer peripheral surface of the outer ring and is connected to an end portion on an outer peripheral side of the plurality of lubricant supply holes;
   a lubricant inlet port that is connected to the peripheral-direction pipe and is capable of introducing a lubricant in the peripheral-direction pipe from an outside; and a penetration pipe that vertically penetrates the drawbar plate and a lower end of the penetration pipe being connected to the peripheral-direction pipe, wherein the lubricant inlet port is provided on the drawbar plate and is connected to the peripheral-direction pipe via the penetration pipe.

2. The work equipment for the motor grader according to claim 1, wherein the drawbar further includes:

a lateral rib that protrudes from an upper surface of the drawbar plate and extends in the vehicle width direction;

a pair of vertical ribs that protrudes from the upper surface of the drawbar plate, extends forward from a front surface of the lateral rib, and are provided at a distance from each other in the vehicle width direction, wherein the lubricant inlet port is provided in at least one region of a first region, a second region and a third region, the first region being rearward of the lateral rib in the upper surface of the drawbar plate, a second region being outside in the vehicle width direction of one of the pair of the vertical ribs in the upper surface of the drawbar plate and being forward the lateral rib, and a third region being outside in the vehicle width direction of the other of the pair of the vertical ribs in the upper surface of the drawbar plate and being forward the lateral rib.

3. The work equipment for the motor grader according to claim 2, further comprising:

a cover member detachably provided on the upper surface of the drawbar plate so as to cover the lubricant inlet port.

\* \* \* \* \*